No. 880,655. PATENTED MAR. 3, 1908.
F. GUNDORPH.
TROLLEY WIRE FINDER.
APPLICATION FILED MAY 29, 1907.
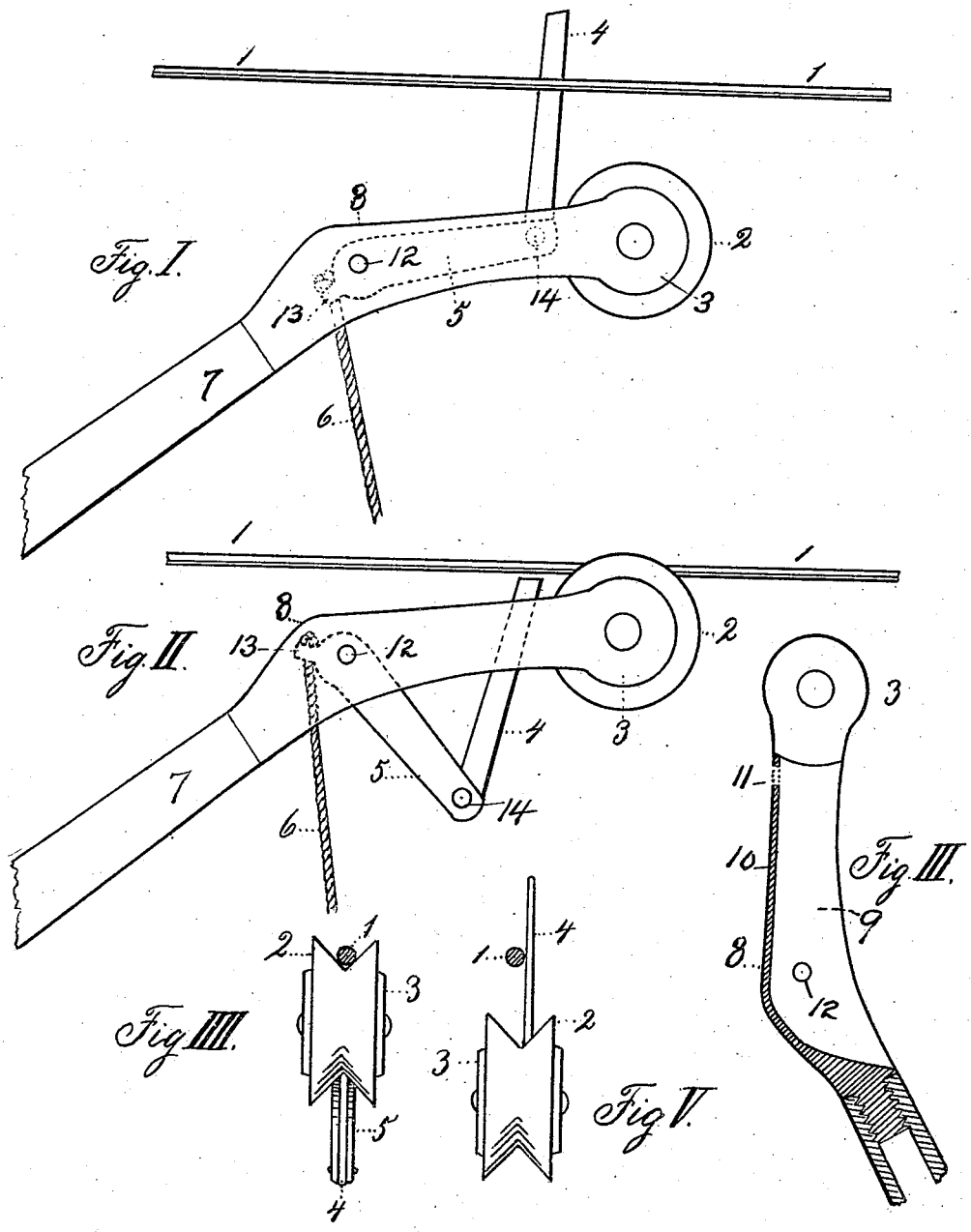
WITNESSES:
O. P. M. Jamison
R. A. Frame
INVENTOR
Ferdinand Gundorph

UNITED STATES PATENT OFFICE.

FERDINAND GUNDORPH, OF PORTLAND, OREGON.

TROLLEY-WIRE FINDER.

No. 880,655.  Specification of Letters Patent.  Patented March 3, 1908.

Application filed May 29, 1907. Serial No. 376,444.

*To all whom it may concern:*

Be it known that I, FERDINAND GUN-DORPH, citizen of the United States, residing at Portland, county of Multnomah and State of Oregon, have invented certain new and useful Improvements in Trolley - Wire Finders, of which the following is a specification, reference being had therein to the accompanying drawing.

This invention relates to a trolley wire finder, and particularly to a finding arm adapted to be projected above the trolley wheel when the pole is under tension of the controlling cord or rope.

The invention has for an object to provide an improved construction of recessed pole head whereby the actuating lever for the finding arm may be completely inclosed and protected, while this arm is adapted to be projected through an aperture in the head adjacent to the trolley wheel by the tension upon the rope or cord used for retracting the trolley and placing it in position.

Other and further objects and advantages of the invention will be hereinafter set forth and the novel features thereof defined by the appended claims.

In the drawing:—Figure 1 is a side elevation showing the finder arm projected; Fig. 2 is a similar view with the arm retracted; Fig. 3 is a detail section of the trolley head adapted to receive the finding mechanism; Fig. 4 is a detail end view of the finder arm shown in Fig. 2, and Fig. 5 is a similar view with the arm in the position shown in Fig. 1.

Like numerals refer to like parts in the several views of the drawing.

Referring to the drawing, the numeral 7 designates a trolley pole of any desired character provided at its upper end with a head piece or casing 8 which is formed with the recess 9 in its under face, the top 10 thereof being closed except for the aperture 11. The free end of this head is provided with the opposite bearing lugs 3 adapted to receive the pivot of the usual trolley wheel 2 which travels in contact with the feed wire 1. Within the recessed head, the lever 5 is pivotally mounted at 12, and the short arm 13 thereof connected with the usual rope or cord 6 by which the trolley is operated. The long arm of the lever 5 is pivotally connected at 14 with the finder arm 4 which extends upward through the aperture 11 in the top wall 10 of the head.

In the operation of the invention, when tension is placed upon the rope for withdrawing the trolley or controlling the same the finder arm is immediately thrown upward above the trolley wheel, as shown in Figs. 1 and 5, and the trolley may then be swung laterally of the wire until this arm engages the wire when, by releasing the cord, the wheel will rise into contact with the wire in proper position thereon. As soon as the trolley is in contact with the wire and tension is released from the cord the weight of the extended arm of the lever retracts the finder arm into the position shown in Fig. 4 thus removing any projection above the trolley wheel which would be liable to catch or interfere with the wire in turning a curve or if the trolley should become displaced from the wire. The structure of the recessed head provides means for inclosing the finder lever so that it is protected from ice and snow by the closed upper face of the trolley head, and the only projecting part above this face is the extended end of the finder arm. By this construction the trolley may be placed upon the wire without leaving the car or without the necessity of seeing the wire as by a proper indication upon the rope the height of elevation may be determined by which the lateral swing of the trolley head will bring the finder arm into contact with the wire. The finder arm is disposed adjacent to the trolley wheel and intermediate of the sides thereof so as to avoid any lateral projections from the head and to guide the center of the wheel into contact with the wire.

The invention presents a simple, efficient and thoroughly protected structure adapted for application to any character of trolley pole.

Having described my invention and set forth its merits, what I claim and desire to secure by Letters Patent is:—

1. A device of the class described comprising a recessed trolley head having a guiding slot therein, an actuating lever pivotally mounted therein, and a finder arm pivoted to said lever and extending upward through said slot.

2. In a device of the class described, a trolley head provided with a wheel at its free end, a lever pivotally mounted in said head, a finder arm pivoted to said lever and projected above the head intermediate of the opposite sides of said wheel to guide the center thereof into contact with a wire, and operating means for said lever extending from said head.

3. In a device of the class described a trolley head provided with an operating lever pivoted therein having a short operating arm and a long depending arm, a finder arm extending through said head and pivoted to said depending arm, and an operating connection extending from the short arm of said lever.

4. In a device of the class described, a trolley head comprising a casing having a recess in its under face and an aperture through the upper face thereof, a wheel pivoted at one end of said recess, an operating lever pivoted at the opposite end thereof, and a finder arm pivoted to said lever and disposed adjacent to said aperture.

In testimony whereof I affix my signature in presence of two witnesses.

FERDINAND GUNDORPH.

Witnesses:
E. E. VAN ALSTINE,
R. A. FRAME.